(12) United States Patent
Claussner

(10) Patent No.: US 6,507,651 B1
(45) Date of Patent: Jan. 14, 2003

(54) HYBRID AMPLIFIER

(75) Inventor: Lothar Claussner, Nürnberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/253,079

(22) Filed: Feb. 19, 1999

(30) Foreign Application Priority Data

Feb. 20, 1998 (DE) .......................................... 198 07 074

(51) Int. Cl.[7] .............................................. H04M 1/00

(52) U.S. Cl. ....................................... 379/402; 379/398

(58) Field of Search ........................... 379/398, 399.01, 379/402, 403

(56) References Cited

U.S. PATENT DOCUMENTS 5,260,995 A * 11/1993 Ikefuji ......................... 379/402
5,579,144 A * 11/1996 Whitney ...................... 379/402

* cited by examiner

*Primary Examiner*—Forester W. Isen
*Assistant Examiner*—Jefferey Harold
(74) *Attorney, Agent, or Firm*—Dicran Halajian

(57) ABSTRACT

The invention relates to a circuit arrangement (1) for coupling a communication device (3) having at least one unidirectional transmission channel (4) and at least one unidirectional receive channel (5) to a bidirectional communication device having at least one differential amplifier (Q1, Q2). For optimizing the properties of the coupling by such a circuit arrangement (1) with the simplest possible means, there is proposed to couple the control inputs (C, D) of the differential amplifier (Q1, Q2) to the outputs of a transmission channel (4), its outputs (A, B) to the bidirectional communication device and the negative feedback path of the differential amplifier (Q1, Q2) to an input (E) of a receive channel (5). Its negative feedback path includes a matching impedance (R4, R5, C2) for adjusting a DC voltage/DC current characteristic (6) for the circuit arrangement (1) when connected to the bidirectional communication device.

6 Claims, 3 Drawing Sheets

HYBRID AMPLIFIER

Figure 1:
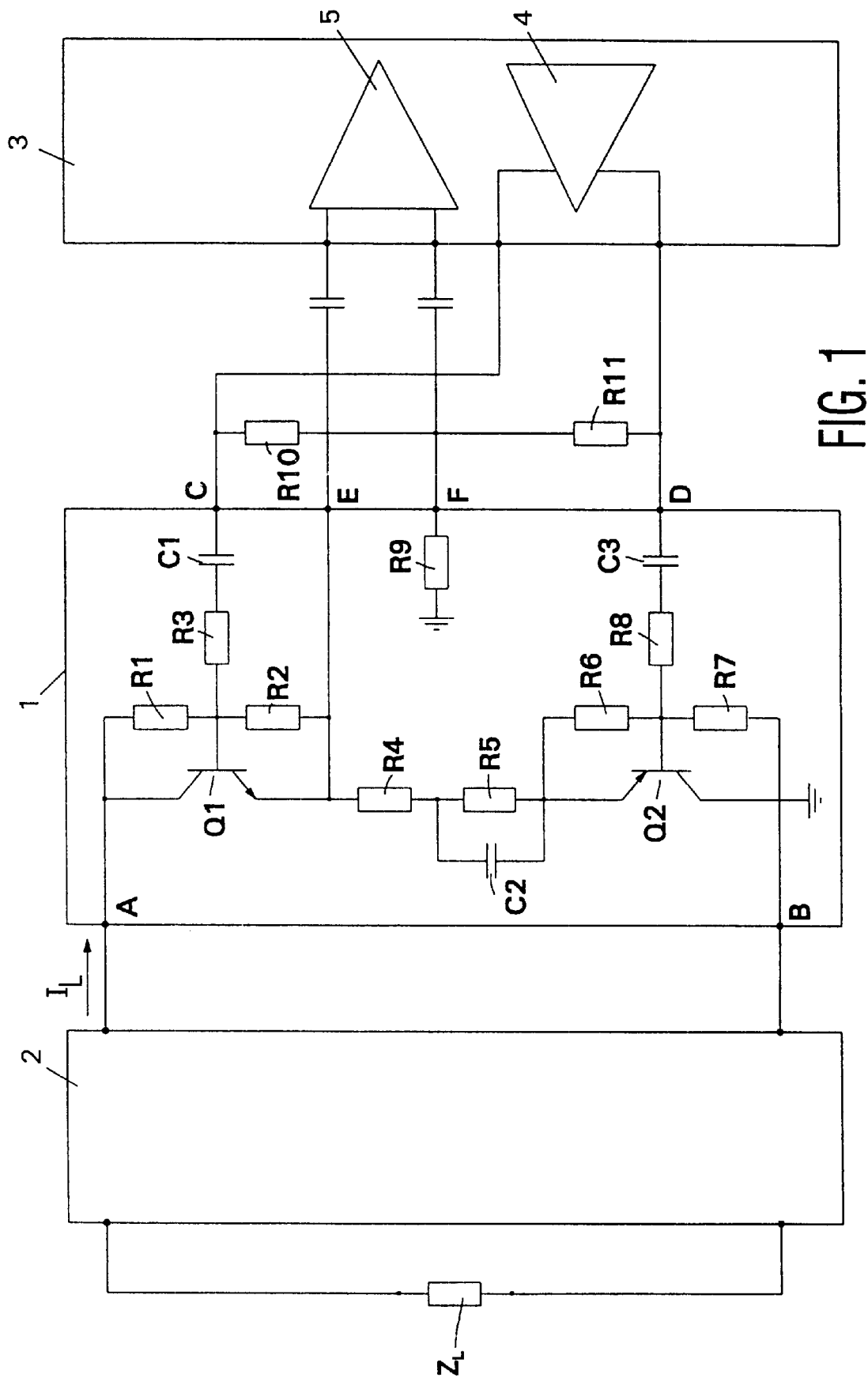

The invention relates to a circuit arrangement for coupling a communication device having at least one unidirectional transmission channel and at least one unidirectional receive channel to a bidirectional communication device having at least one differential amplifier.

Such a circuit arrangement provides, more particularly, a hybrid circuit for splitting up a bidirectional communication device (for example a two-wire link) transmitting both the transmission channel and the receive channel, in a communication device having a separate, unidirectional transmission channel and receive channel (for example, a four-wire link), which communication device simultaneously provides a suitable amplification of the decoupled transmit and receiving channels. Hybrid circuits can be included at any place where transmission paths have to be split up within communication networks. For example, within the coverage area of telephone networks, two-wire links are used especially for reasons of cost-saving, the two directions running over a pair of lines. For amplifying the signals on trunk lines in both directions, a four-wire link with a line pair for either direction and the respective amplifiers is to be split up. Also when a subscriber terminal is to be connected to the local network, the directions of transmission and reception (microphone and loudspeaker) inside the device are to be separated.

The object of the invention is to provide a circuit arrangement of the type defined in the opening paragraph which optimizes the properties of the coupling with the simplest possible means.

The object is achieved in that the control inputs of the differential amplifier are coupled to the outputs of a transmission channel, the outputs of the differential amplifier to the bidirectional communication device, and the negative feedback path of the differential amplifier is coupled to an input of a receive channel, a matching impedance being provided in its negative feedback path for adjusting a DC voltage/DC current characteristic for the circuit arrangement when connected to the bidirectional communication device.

Preferred embodiments representing particularly advantageous embodiments of the invention can be taken from the patent claims and the description of the examples of embodiment.

These and other aspects of the invention will be apparent from and elucidated with reference to the examples of embodiment described hereinafter.

Figure 2:
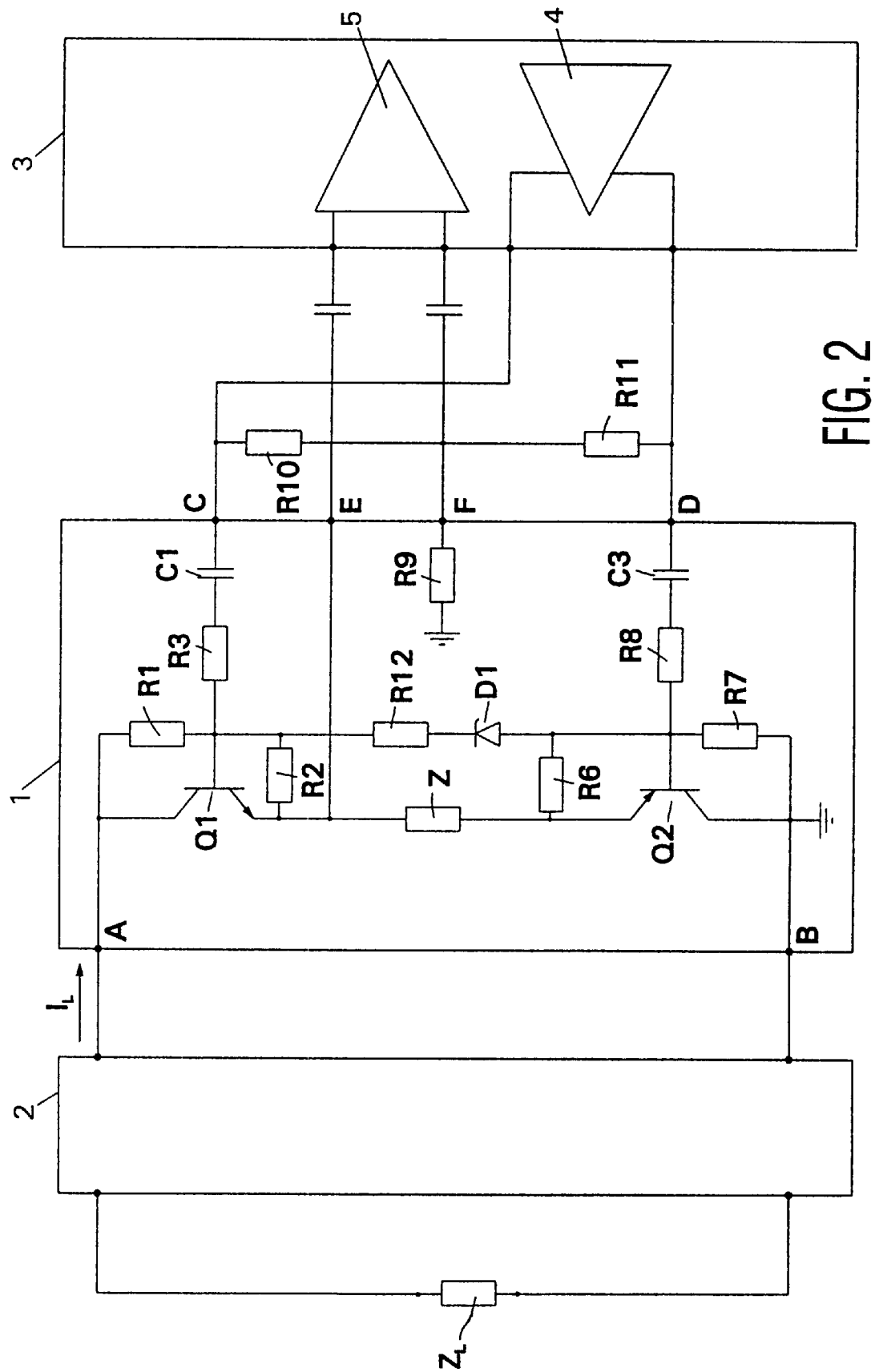
Figure 3:
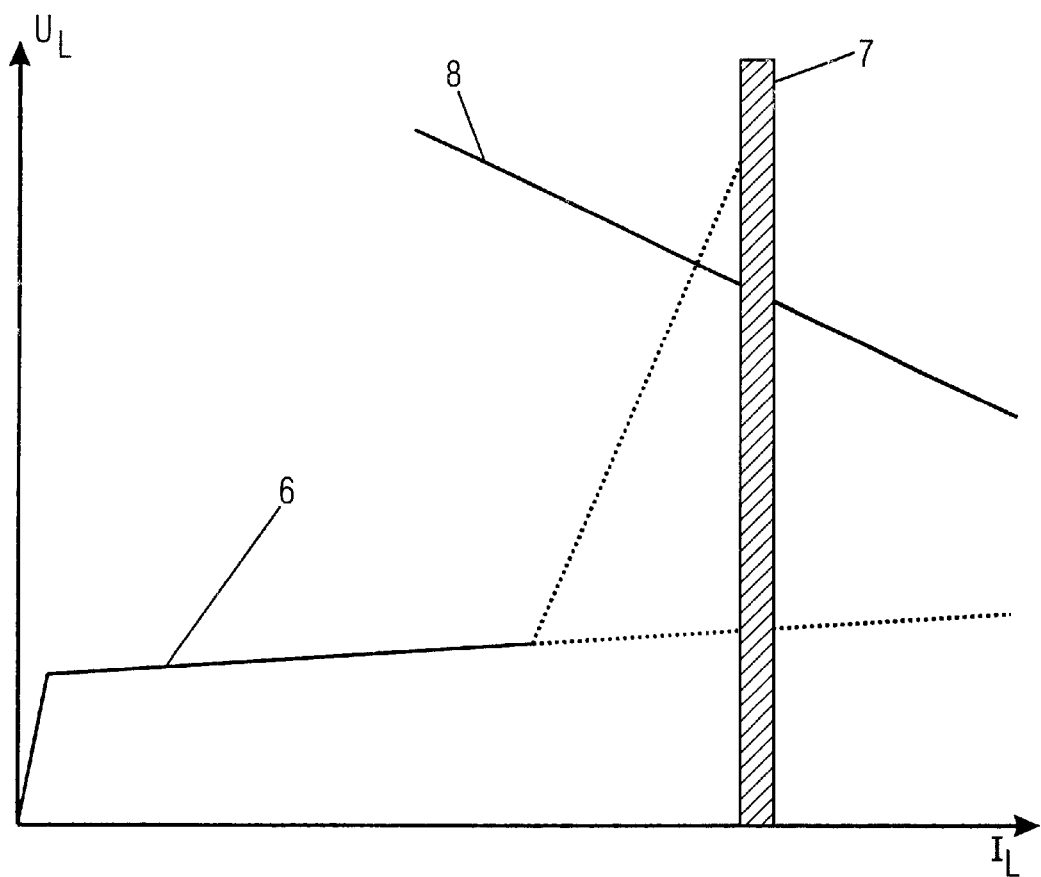

In the drawings:

FIG. 1 shows a circuit diagram of a hybrid amplifier according to the invention, FIG. 2 shows an extended embodiment of the hybrid amplifier according to the invention, and FIG. 3 shows an associated DC voltage/DC current characteristic.

FIG. 1 shows a circuit arrangement for a hybrid amplifier 1. The hybrid amplifier 1 is connected with the terminals A and B to a two-wire line (for example, to a local network). The two-wire line is represented by a load impedance $Z_{LAST}$ which may be described by a parallel circuit of an ohmic resistance and a capacitance in series with a further resistance. The local network is supplied with power by a power supply 2 having a DC voltage source, so that at the points AB the voltage $U_L$ is present and the current $I_L$ is flowing. On the four-wire side of the hybrid amplifier 1, the input (connections C and D) is connected to a transmission channel 4 of a communication device 3 (for example, a baseband circuit in a telephone terminal). The outputs E and F are coupled to a receive channel 5 of the baseband circuit 3.

The hybrid amplifier 1 comprises a differential amplifier amplifying the complementary transmit signals on the inputs C and D. The input C is connected to a base terminal of a transistor Q1 via an isolating capacitor C1 and a bias resistor R3. The base terminal is further connected via a negative feedback resistor R1 to a collector terminal of the transistor Q1 which is coupled to the two-wire line at point A. The base terminal is further connected to an emitter terminal of the transistor Q1 via an operating point resistor R2. Accordingly, the complementary transmit signal on input D is applied to a base terminal of a transistor Q2 via an isolating capacitor C3 and a bias resistor R8. The base terminal is connected to a collector terminal via a negative feedback resistor R7 and to an emitter terminal via an operating point resistor R6. The collector terminal of the transistor Q2 is coupled to the two-wire line at terminal B which is connected to ground. The emitter terminal of the transistor Q1 is connected to the emitter terminal of the transistor Q2 via a matching impedance. The matching impedance is formed by a circuit comprising a resistor R4 connected in series with a parallel circuit formed by a resistor R5 and a capacitor C2.

The emitter terminal of the transistor Q1 forms the output E and is connected to an input of the receive channel 5 of the baseband circuit 3. A second input of the receive channel 5 is connected to the output F which is connected to ground via a resistor R9. The output F is further connected to the input C via a resistor R10 and to the input D via a resistor R11. With a correct dimensioning, DC clock signals of the transmission channel 4 for the receive channel 5 can be suppressed. Together with the attenuation of the transmit signal relative to ground at terminal E, this provides a good sidetone reduction of the hybrid amplifier 1.

A DC current $I_L$ supplied on the two-wire line side leads to the following voltage variation on the terminals AB. As long as the voltage on the respective resistors R2 and R6 is smaller than the necessary base-emitter voltage of the transistors Q1 and Q2, there is a voltage $U_{AB} \approx I_L*(R1+R2+R4+R5+R6+R7)$ on the terminals AB. When the necessary base-emitter voltage is exceeded, the collector-emitter path of the transistors Q1 and Q2 become conductive, so that there is a voltage change of $\Delta U_{AB}/\Delta I_L \approx R4+R5$. This provides that a suitable DC voltage/DC current characteristic 6 can be adjusted for the hybrid amplifier 1.

The DC voltage/DC current characteristic 6 is shown in FIG. 3. Particularly the different slopes of the characteristic 6 described above are shown. A DC current limitation 7 is entered since a maximum current load is often prescribed for communication devices. Furthermore, a power supply characteristic 8 is shown, representing the variation of the DC voltage supplied by the power supply 2. As may be observed, when a gradual slope of the characteristic 6 is required and a small maximum permissible DC current, the current in the communication device will not be regulated in accordance with the power supply characteristic 8 until the DC current limitation 7 is reached. For that case, a third slope in the characteristic 6 can be realized in that the hybrid amplifier as represented in FIG. 2 and associated description is complemented.

For attenuating the reflection of the hybrid amplifier 1, the A.C. impedance (device impedance) to be detected between A and B is to be adapted to the line impedance of the two-wire line. The A.C. impedance is a multiple of the matching impedance between the emitters Q1 and Q2 (R5 parallel to C2 in series with R4). The ratio of negative feedback resistance (R1, R7) to a bias resistance (R3, R8, respectively) is the multiplicand. As the resistance ratio corresponds to the multiplicand with a maximum deviation of 10%, the dimensioning can provide a matching of the device impedance. Furthermore, the complementary design of the hybrid amplifier 1 (Q1 and Q2) amplifies the symmetrical transmit signal on the terminals C and D of the four-wire line to the terminal A of the two-wire line and simultaneously achieves a common-mode rejection ratio.

FIG. 2 shows a further example of embodiment of the hybrid amplifier 1 according to the invention, which example of embodiment corresponds in essence to the circuit arrangement shown in FIG. 1. The matching impedance between the emitters of the transistors Q1 and Q2 is here represented by a complex resistance Z. Complementary to the first example of embodiment, the base terminals of the transistors Q1 and Q2 are furthermore interconnected by a resistor R12 connected in series to a zener diode D1. This makes the DC voltage/DC current characteristic 6 of the hybrid amplifier 1 change in such a way that the characteristic 6 bends off from an adjustable value as shown in FIG. 3. This achieves a limitation of the maximum flowing current $I_l$ in accordance with the power supply characteristic 8. As a result thereof, the DC current limitation 7 may be maintained.

What is claimed is:

1. A circuit arrangement (1) for coupling a communication device (3) having at least one unidirectional transmission channel (4) and at least one unidirectional receive channel (5) to a bidirectional communication device having at least one differential amplifier (Q1, Q2), whose control inputs (C, D) are coupled to the outputs of a transmission channel (4), its outputs (A, B) to the bidirectional communication device, and its negative feedback path is coupled to an input (E) of a receive channel (5), and a matching impedance (R4, R5, C2) being provided in its negative feedback path for adjusting a DC voltage/DC current characteristic (6) for the circuit arrangement (1) when connected to the bidirectional communication device.

2. A circuit arrangement (1) as claimed in claim 1, characterized in that at least a series combination comprising at least a resistor (R4) and at least a parallel combination of at least a resistor (R5) and a capacitor (C2) is provided for forming the matching impedance.

3. A circuit arrangement (1) as claimed in claim 1, characterized in that the differential amplifier includes two complementary switched transistors (Q1, Q2) for amplifying a transmit signal received from the transmission channel (4), or a complementary transmit signal, respectively.

4. A circuit arrangement (1) as claimed in claim 3, characterized in that a base terminal of the transistors (Q1, Q2) is connected to the transmit signal or complementary transmit signal via at least one respective isolating capacitor (C1, C3) and a bias resistor (R3, R8), in that a collector terminal of the transistors (Q1, Q2) is connected to a respective terminal (A, B) of the bidirectional communication device, in that the emitter terminals of the transistors (Q1, Q2) are interconnected via the matching impedance (R4, R5, C2) in the negative feedback path and in that a base terminal of the transistors (Q1, Q2) is connected to an associated collector terminal via at least one negative feedback resistor (R1, R7) and to an emitter terminal via at least one operating point resistor (R2, R6).

5. A circuit arrangement (1) as claimed in claim 4, characterized in that a dimensioning of the matching impedance (R4, R5, C2) of the negative feedback resistance (R1, R7) and of the bias resistance (R3, R8) provides that the matching impedance (R4, R5, C2) is multiplied by the ratio of negative feedback resistance (R1, R7) to bias resistance (R3, R8) about equals the self-impedance of the coupled bidirectional communication device.

6. A circuit arrangement (1) as claimed in claim 4, characterized in that the base terminals of the transistors (Q1, Q2) are further coupled via a resistor (R12) and a zener diode (D1).

\* \* \* \* \*